US012761959B2

(12) United States Patent
Nie et al.

(10) Patent No.: US 12,761,959 B2
(45) Date of Patent: Oct. 13, 2026

(54) METHOD, DEVICE, AND COMPUTER PROGRAM PRODUCT FOR MONITORING DISTRIBUTED SYSTEM

(71) Applicant: Dell Products L.P., Round Rock, TX (US)

(72) Inventors: Yuhong Nie, Shanghai (CN); Tianxiang Chen, Shanghai (CN); Zhen Jia, Shanghai (CN)

(73) Assignee: Dell Products L.P., Round Rock, TX (US)

(*) Notice: Subject to any disclaimer, the term of this patent is extended or adjusted under 35 U.S.C. 154(b) by 474 days.

(21) Appl. No.: 18/427,297

(22) Filed: Jan. 30, 2024

(65) Prior Publication Data

US 2025/0231803 A1 Jul. 17, 2025

(30) Foreign Application Priority Data

Jan. 12, 2024 (CN) ......................... 202410050110.2

(51) Int. Cl.
*G06F 9/50* (2006.01)
*G06F 11/30* (2006.01)

(52) U.S. Cl.
CPC ........ *G06F 9/5027* (2013.01); *G06F 11/3006* (2013.01); *G06F 11/301* (2013.01); (Continued)

(58) Field of Classification Search
USPC ........................................................ 702/182
See application file for complete search history.

(56) References Cited

U.S. PATENT DOCUMENTS

2014/0046998 A1* 2/2014 Dain ........................ H04L 67/10 709/201
2014/0108483 A1* 4/2014 Tarta ..................... G06F 9/5072 709/201

(Continued)

OTHER PUBLICATIONS

Wiki, "perf: Linux Profiling with Performance Counters," https://perf.wiki.kernel.org/index.php/Main_Page, Feb. 24, 2023, 2 pages.

*Primary Examiner* — Paul D Lee
(74) *Attorney, Agent, or Firm* — Ryan, Mason & Lewis, LLP

(57) ABSTRACT

The present disclosure relates to a method, a device, and a computer program product for monitoring a distributed system. The method includes starting a distributed computing service on a first node in response to receiving a distributed task. The method further includes sending a request for registering an application manager from the first node to a second node, and receiving an application identification of the application manager from the second node by the first node. The method further includes determining process identifications of containers in a cluster resource management layer by the first node based on the received application identification. The method further includes monitoring performance indexes of the distributed system based on the process identifications. In this way, various nodes in the distributed system can communicate, containers distributed on the nodes are positioned and monitored in time, and their comprehensive performance indexes are automatically monitored.

20 Claims, 9 Drawing Sheets

(52) U.S. Cl.
CPC ........ *G06F 9/5072* (2013.01); *G06F 11/3051* (2013.01); *G06F 11/3058* (2013.01); *G06F 2209/505* (2013.01)

(56) References Cited

U.S. PATENT DOCUMENTS

| | | | | |
|---|---|---|---|---|
| 2014/0245298 | A1* | 8/2014 | Zhou | G06F 9/45558 718/1 |
| 2016/0364172 | A1* | 12/2016 | Frank | G06F 9/54 |
| 2017/0102694 | A1* | 4/2017 | Enver | G05B 19/4184 |
| 2017/0160984 | A1* | 6/2017 | Frank | G06F 3/0619 |
| 2019/0146848 | A1* | 5/2019 | Rastogi | G06F 9/5061 718/104 |
| 2019/0188107 | A1* | 6/2019 | Alston | G06F 11/3006 |
| 2023/0297486 | A1* | 9/2023 | Nomura | G06F 11/3409 718/104 |

* cited by examiner

METHOD, DEVICE, AND COMPUTER PROGRAM PRODUCT FOR MONITORING DISTRIBUTED SYSTEM

RELATED APPLICATION

The present application claims priority to Chinese Patent Application No. 202410050110.2, filed Jan. 12, 2024, and entitled "Method, Device, and Computer Program Product for Monitoring Distributed System," which is incorporated by reference herein in its entirety.

FIELD

Embodiments of the present disclosure relate to the field of distributed computing, and more particularly, to a method, a device, and a computer program product for monitoring a distributed system.

BACKGROUND

Currently, with the increasing scale of large-scale datasets, distributed systems have been widely applied due to their ability to process large amounts of data. Analyzing the performance indexes of the distributed systems is an effective way to optimize distributed computing work in the application process of the distributed systems.

Typically, the performance indexes of the distributed systems include job level performance indexes, system level performance indexes, and micro-architecture level performance indexes. The job level performance indexes can be obtained by monitoring specified computing tasks of the distributed systems, and most distributed computing frameworks can provide monitoring for the job level performance indexes. In addition, the system level performance indexes can also be obtained by monitoring the distributed systems through cluster resource management services.

SUMMARY

Embodiments of the present disclosure provide a method, a device, and a computer program product for monitoring a distributed system. In a first aspect of embodiments of the present disclosure, a method for monitoring a distributed system is provided. The method includes starting a distributed computing service on a first node in response to receiving a distributed task. The method further includes sending a request for registering an application manager from the first node to a second node. The method further includes receiving an application identification of the application manager from the second node by the first node. The method further includes determining process identifications of containers in a cluster resource management layer by the first node based on the received application identification. The method further includes monitoring performance indexes of the distributed system based on the process identifications.

In a second aspect of embodiments of the present disclosure, an electronic device is provided. The electronic device includes at least one processor, and a memory coupled to the at least one processor and having instructions stored thereon, wherein the instructions, when executed by the at least one processor, cause the electronic device to perform actions for monitoring a distributed system. The actions comprise starting a distributed computing service on a first node in response to receiving a distributed task, sending a request for registering an application manager from the first node to a second node, receiving an application identification of the application manager from the second node by the first node, determining process identifications of containers in a cluster resource management layer by the first node based on the received application identification, and monitoring performance indexes of the distributed system based on the process identifications.

In a third aspect of embodiments of the present disclosure, a computer program product is provided, wherein the computer program product is tangibly stored on a non-transitory computer-readable medium and comprises machine-executable instructions that, when executed by a machine, cause the machine to perform actions for monitoring a distributed system. The actions comprise starting a distributed computing service on a first node in response to receiving a distributed task, sending a request for registering an application manager from the first node to a second node, receiving an application identification of the application manager from the second node by the first node, determining process identifications of containers in a cluster resource management layer by the first node based on the received application identification, and monitoring performance indexes of the distributed system based on the process identifications.

It should be understood that the content described in this Summary is neither intended to limit key or essential features of embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

In all the accompanying drawings, identical or similar reference numerals indicate identical or similar elements.

DETAILED DESCRIPTION

Figure 1A:
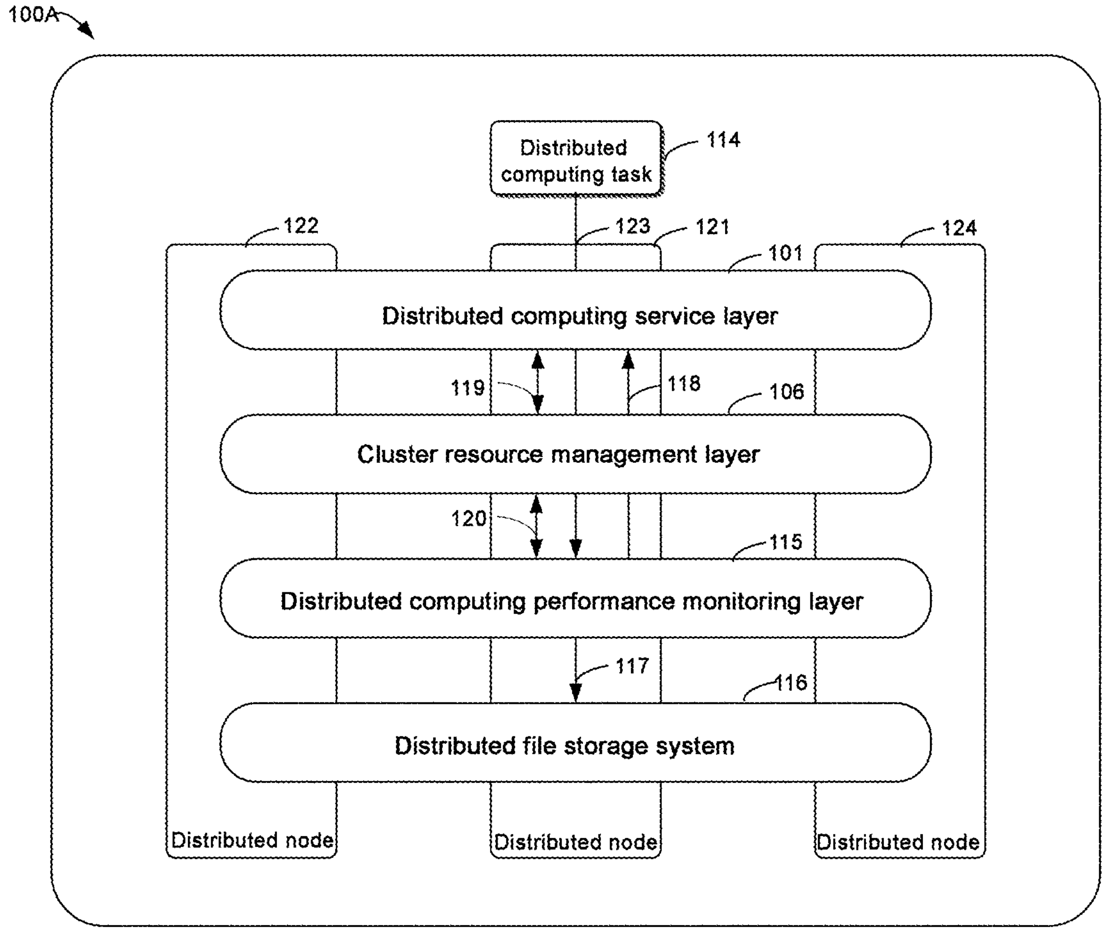
FIG. 1A and FIG. 1B illustrate schematic diagrams of respective example environments in which multiple embodiments of the present disclosure can be implemented.

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

In the description of the embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects, unless explicitly illustrated. Other explicit and implicit definitions may also be included below.

As mentioned above, the job level performance indexes refer to some indexes that directly measure the performance of a specified computing task. Different from the job level performance indexes, the system level performance indexes refer to general system performance of specific tasks, such as memory usage, I/O speed, and network throughput. The micro-architecture level performance indexes refer to hardware implementation of ISA (Instruction Set Architecture). Compared with the system level performance indexes, the micro-architecture level performance indexes remain at a lower level in a computer architecture. Some common micro-architecture level performance indexes include IPC (instructions/cycle), OCBW (off-chip bandwidth utilization), etc.

At present, most distributed systems provide job level index monitoring, and there are also some performance analyzers that can simultaneously monitor the system level performance indexes and the micro-architecture level performance indexes. However, for the distributed systems, ordinary performance analyzers usually do not work. Generally, the system performance analyzers can only be used by a single node and can only monitor single processes. Specifically, in the working process of an existing system performance analyzer, a task allocator in a distributed system is usually started first to achieve monitoring of the task allocator. However, due to the single process and single node monitoring characteristics of the system performance analyzer, after monitoring the task allocator, it is impossible to monitor task executors distributed on different nodes. Therefore, so far, there has not been a good integration between the system performance analyzer and the distributed system, and there is no comprehensive monitoring method that can simultaneously monitor the three performance indexes of the distributed system mentioned above.

For this purpose, embodiments of the present disclosure provide a solution for monitoring a distributed system. In this solution, a distributed computing service is started on a first node, thereby monitoring the distributed computing service. The first node receives an application identification of an application manager from a second node by monitoring the distributed service, then the first node may determine process identifications of containers in a cluster resource management layer according to the application identification, and in this way, nodes in the distributed system may position and monitor the containers in time, thereby achieving the purpose of monitoring performance indexes of the distributed system. In this way, various nodes in the distributed system can communicate, containers distributed on the nodes are positioned and monitored in time, the performance indexes of the distributed system are thoroughly monitored from two levels including a system level and a micro-architecture level, and the efficiency of optimizing the computing work is improved.

Figure 1B:
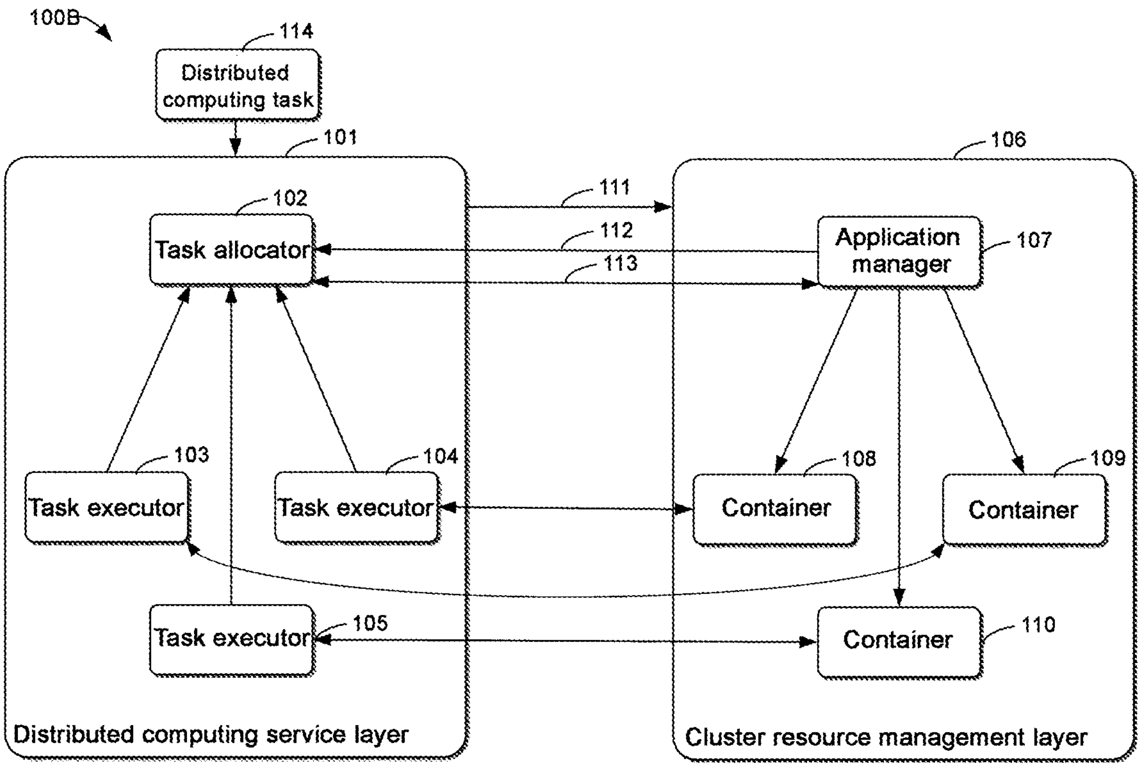

FIG. 1A and FIG. 1B illustrate schematic diagrams of respective example environments 100A and 100B in which multiple embodiments of the present disclosure can be implemented. As shown in FIG. 1A, an example environment 100A may include a node 121, a node 124, and a node 122, the node 121, the node 124, and the node 122 are all nodes in a distributed system, the nodes may be a data terminal device that can send, receive, or forward information through communication channels, such as a router, a workstation, or a server. The number of the nodes in the distributed system can be selected according to actual needs. Here, the architecture and functions in the example environment 100A are described for illustrative purposes only.

Referring to FIG. 1A, the example environment 100A may further include a distributed computing service layer 101, a cluster resource management layer 106, a distributed computing performance monitoring layer 115, and a distributed file storage system 116. The distributed computing service layer 101 is used for completing a specified distributed computing task 114, and the distributed computing task 114 in which a large amount of computing is needed is divided into small blocks, which are computed on the node 121, the node 124, and the node 122 respectively. The cluster resource management layer 106 is used for providing resource support for the distributed computing task 114 divided into the small blocks. The distributed computing performance monitoring layer 115 is used for positioning and monitoring containers in the cluster resource management layer 106 to obtain system performance indexes. The distributed file storage system 116 is used for storing the performance indexes obtained by monitoring according to categories for retrieval by users. In some embodiments, the distributed computing service layer 101, the cluster resource management layer 106, the distributed computing performance monitoring layer 115, and the distributed file storage system 116 may be deployed on the node 121, the node 124, and the node 122.

In some embodiments, a monitoring process of the distributed system in the present disclosure is as follows, at 123, the distributed computing performance monitoring layer 115 receives a distributed computing task 114. At 118, after receiving the distributed computing task 114, the distributed computing performance monitoring layer 115 starts the distributed computing service layer 101 to monitor the distributed computing service layer 101. At 119, the distributed computing service layer 101 divides the distributed computing task 114 into small blocks and communicates with the cluster resource management layer 106 to obtain resource support required by distributed computing. At 120, by monitoring the distributed computing service layer 101, the distributed computing performance monitoring layer 115 may obtain an application identification of an application manager sent to the distributed computing service layer 101 by the cluster resource management layer 106. Process identifications of the containers in the cluster resource management layer 106 may be determined based on the application identification of the application manager, and thus positioning and monitoring of the containers are achieved. At 117, the distributed computing performance monitoring layer 115 stores in the distributed file storage system 116 the performance indexes obtained by monitoring, for retrieval by users.

As shown in FIG. 1B in example environment 100B, the distributed computing service layer 101 may include a task allocator 102, a task executor 103, a task executor 104, and a task executor 105. When the distributed computing service layer 101 receives the distributed computing task 114, the task allocator 102 divides the distributed computing task 114 into small blocks, and the small blocks are allocated to the task executors on different nodes to be computed. The task executors require resource support for executing the computing work, and resources are provided by the cluster resource management layer 106. At 111, after receiving the distributed computing task 114, the distributed computing service layer 101 sends a request for registering an application manager 107 to the cluster resource management layer 106, the application manager 107 may be a container with resource scheduling and allocation management functions, and the application manager 107 has an application identification. At 112, after the application manager 107 is registered, the required resources are provided to the task allocator 102, and a new container may be provided to the task allocator 102 as resource support. At 113, after completing task allocation, the task allocator 102 communicates with the application manager 107 to apply the resources required by the task executors to the application manager 107, and the application manager 107 allocates the containers according to the request of the task allocator 102.

As shown in FIG. 1B, the arrangement of task executors relative to their respective corresponding containers illustrate correspondence between lower layer resource management and upper layer computing management. More specifically, for the task executor 103 associated with the container 109, the container 109 provides resource support to the task executor 103; for the task executor 104 associated with the container 108, the container 108 provides resource support to the task executor 104; and for the task executor 105 associated with the container 110, the container 110 provides resource support to the task executor 105.

It is apparent from the above description that, in the solution of embodiments of the present disclosure, the distributed computing performance monitoring layer is configured in the distributed system, and the distributed computing performance monitoring layer is used for positioning and monitoring the containers in the cluster resource management layer, so that task executors which are started implicitly are searched for, and their comprehensive performance indexes are automatically monitored. In addition, in embodiments of the present disclosure, the performance indexes of the distributed system are thoroughly monitored from two levels including a system level and a microarchitecture level, and the efficiency of optimizing the computing work is improved.

It should be understood that description of the architecture and function in the example environments 100A and 100B is made for illustrative purposes only and does not imply any limitation to the scope of the present disclosure. Embodiments of the present disclosure may also be applied to other environments with different architectures and/or functions.

A process of an embodiment of the present disclosure will be described in detail below with reference to FIG. 2 to FIG. 8. Specific data mentioned in the following description for the convenience of understanding is exemplary and is not intended to limit the protection scope of the present disclosure. It should be understood that embodiments described below may also include additional actions not shown and/or may omit actions shown, and the scope of the present disclosure is not limited in this regard.

Figure 2:
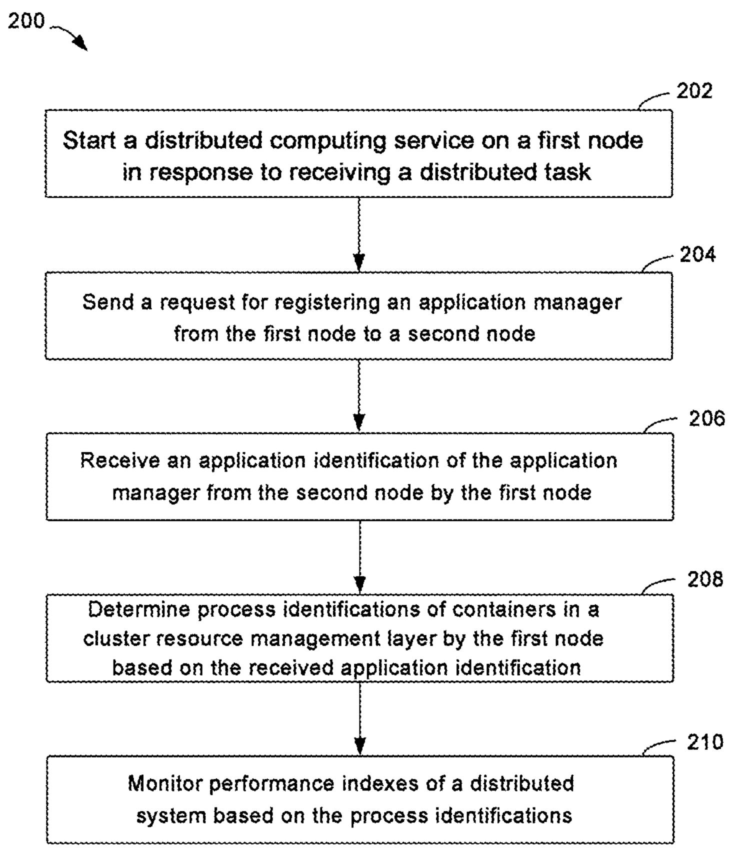
FIG. 2 illustrates a flow chart of a method for monitoring a distributed system according to some embodiments of the present disclosure.

FIG. 2 illustrates a flow chart of a method 200 for monitoring a distributed system according to some embodiments of the present disclosure. At block 202, a distributed computing service is started on a node in response to receiving a distributed task. For example, as shown in FIG. 1A, after receiving the distributed computing task 114, the distributed computing performance monitoring layer 115 may start the distributed computing service layer 101 on the node 121 through a starter, the distributed computing performance monitoring layer 115 may monitor the distributed computing service layer 101 by monitoring the starter, and of course, the distributed computing service layer 101 may also be started on other nodes, depending on the monitoring of the distributed computing service layer 101.

At block 204, a request for registering an application manager is sent from the node to another node. For example, in the examples shown in FIG. 1A and FIG. 1B, after being started on the node 121, the distributed computing service layer 101 sends the request for registering the application manager 107 to the cluster resource management layer 106. Virtual components in the distributed computing service layer 101 generally include a task allocator 102 and a plurality of task executors; in order to provide resource support to the task allocator 102 and the plurality of task executors, the application manager 107 used for allocating and scheduling resources needs to be registered in the cluster resource management layer 106; and the application manager 107 may be registered on the node 124.

At block 206, an application identification of the application manager is received from the other node by the node. For example, as shown in FIG. 1B, after the application manager 107 is registered on the node 124, the cluster resource management layer 106 sends the application identification of the application manager 107 to the task allocator 102 in the distributed computing service layer 101. In an embodiment of the present disclosure, the distributed computing service layer 101 is started on the node, so the task allocator 102 is also started on the node 121, the application manager 107 may be registered on the node 124, and thus the application identification of the application manager 107 is received from the node 124 by the node 121.

At block 208, process identifications of containers in the cluster resource management layer are determined by the node based on the received application identification. For example, as shown in FIG. 1B, the distributed computing service layer 101 may position the application manager 107 through the application identification to achieve communication between the distributed computing service layer 101 and the application manager 107, and it specifically refers to that the distributed computing service layer 101 may read a log of the application manager 107 through the application identification to determine the process identifications of the containers in the cluster resource management layer 106. It should be understood that the distributed computing task 114 is generally sent to the distributed system continuously, that is to say, the distributed computing service layer 101 allocates new tasks continuously, and for a task executor executing new tasks, the application manager 107 needs to allocate new containers to provide resource support. In a process of managing the containers of the application manager 107, the process identifications of the containers are all recorded on a log of the application manager 107, and by accessing the log of the application manager 107, the node 121 may determine the process identifications of the containers in the cluster resource management layer 106.

At block 210, performance indexes of the distributed system are monitored based on the process identifications. For the sake of system safety, the task executors are implicit components, identifications of the task executors are obscure and unreal for users, and process identifications of the task executors cannot be determined through exposed identifications of the task executors at present. However, the process identifications of the containers include time stamps and current application identifications, and the nodes in the distributed system may accurately and timely position the containers by determining the process identifications of the containers, and may monitor the containers to search the task executors which are started implicitly and automatically monitor their comprehensive performance indexes.

In this way, various nodes in the distributed system can communicate, the containers distributed on the nodes are positioned and monitored in time to search the task executors which are started implicitly, the performance indexes of the distributed system are thoroughly monitored from two levels including a system level and a micro-architecture level, and the efficiency of optimizing the computing work is improved.

Figure 4:
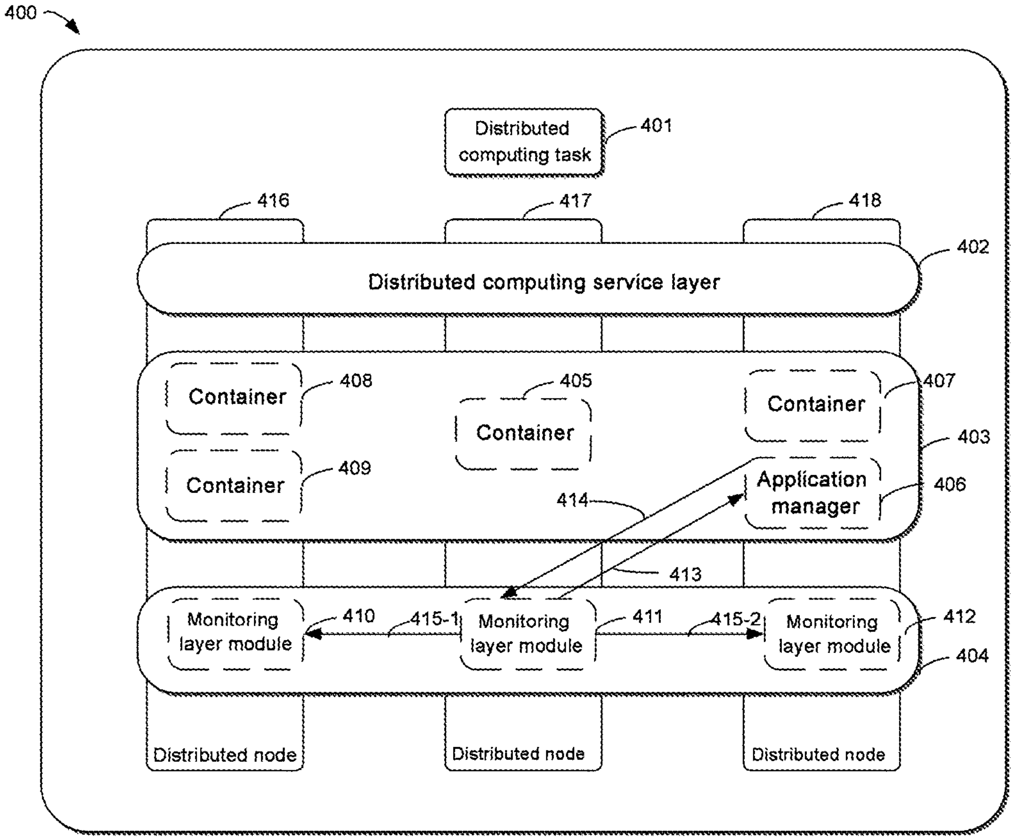
FIG. 4 illustrates a schematic diagram of a process of determining process identifications of containers by a first node according to some embodiments of the present disclosure.
Figure 5:
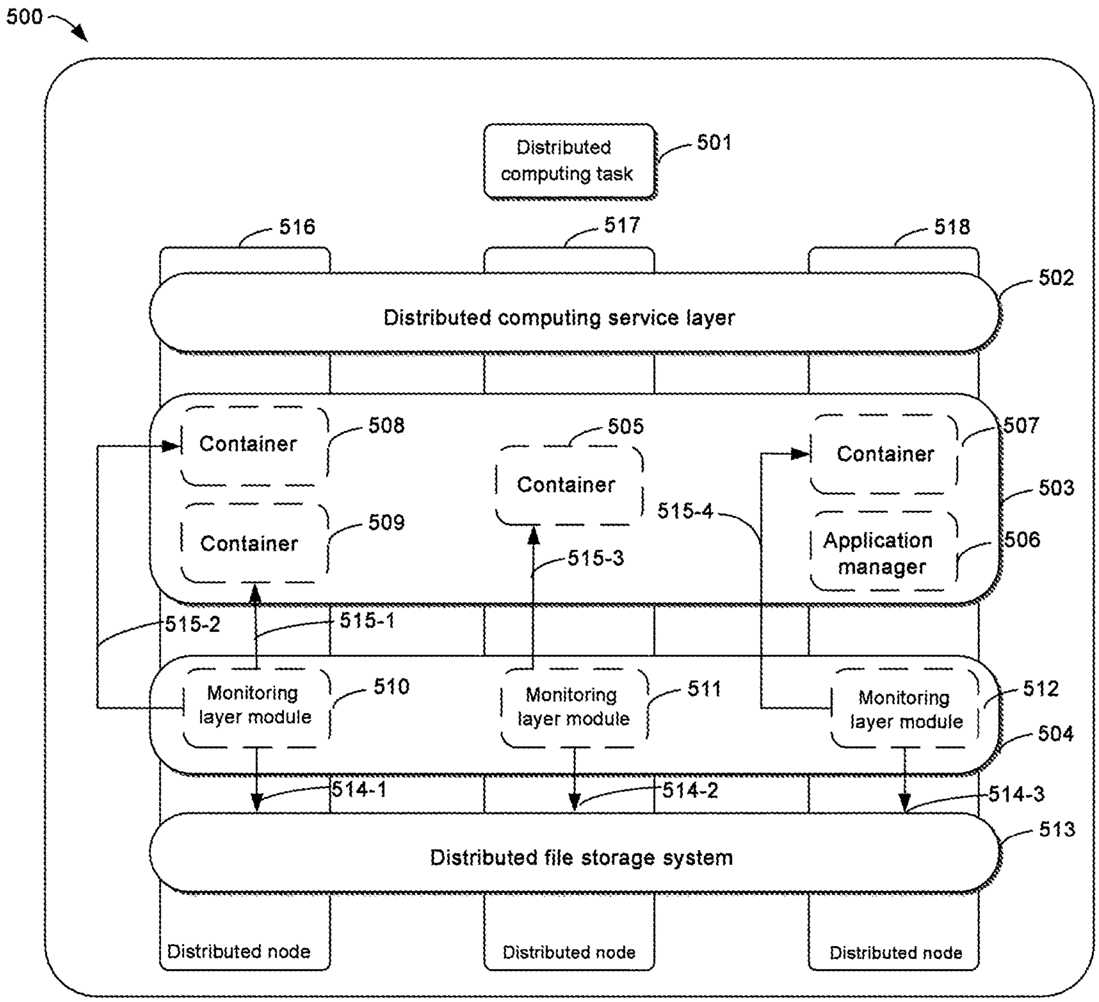
FIG. 5 illustrates a schematic diagram of a process of monitoring containers by respective nodes in a distributed system according to some embodiments of the present disclosure.
Figure 6:
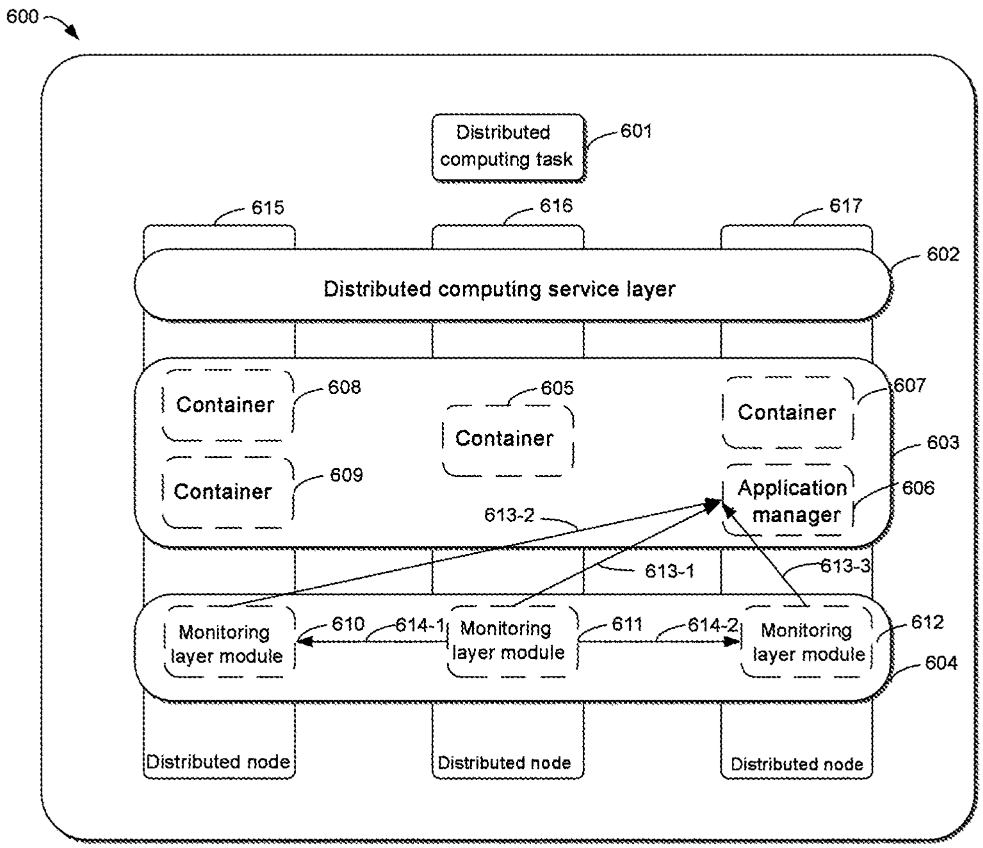
FIG. 6 illustrates a schematic diagram of a process of obtaining an application identification by respective nodes in a distributed system according to some embodiments of the present disclosure.
Figure 7:
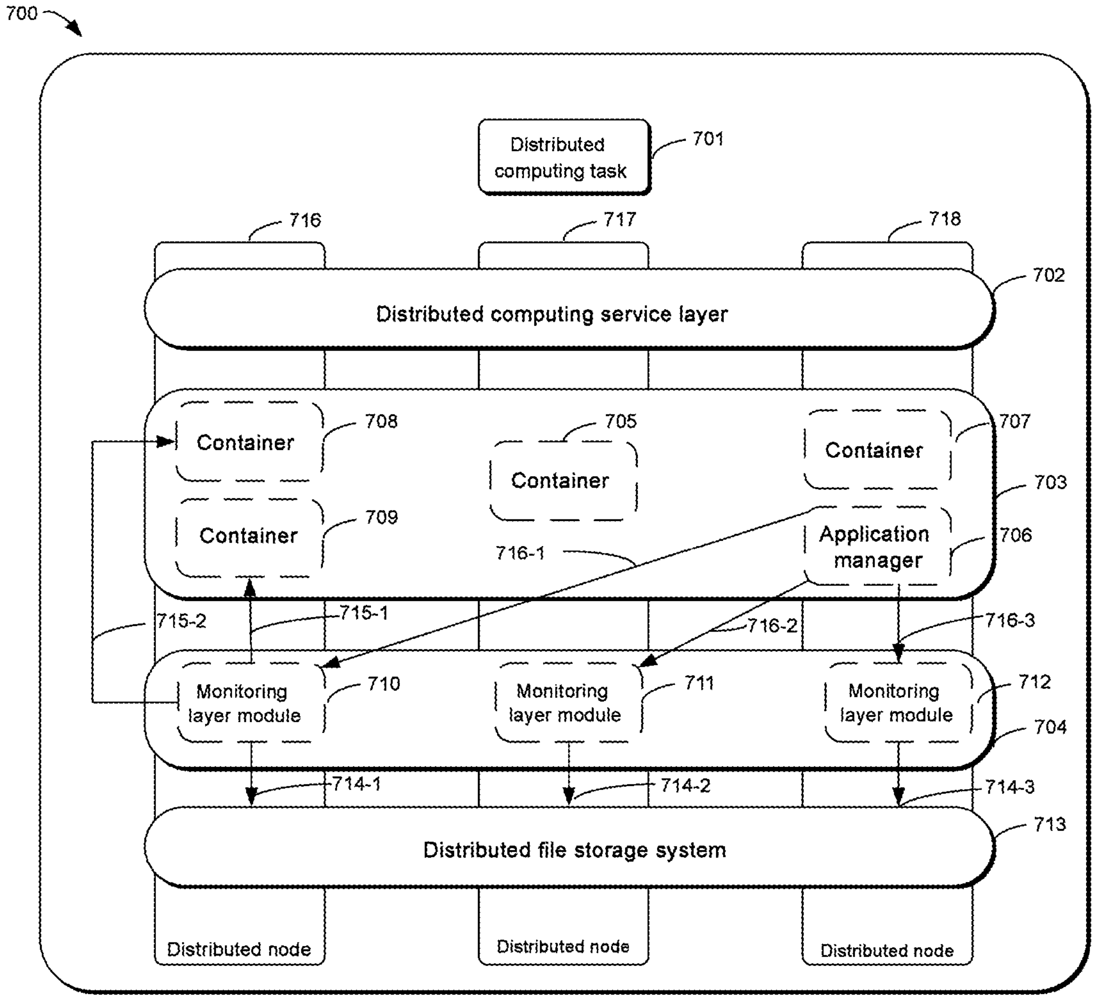
FIG. 7 illustrates a schematic diagram of a process of determining process identifications of containers and monitoring the containers by respective nodes in a distributed system according to some embodiments of the present disclosure.

The process of monitoring the distributed system will be specifically described below with reference to FIG. 3 to FIG. 7. In an embodiment of the present disclosure, explanation and illustration are carried out according to a sequence of passive monitoring and active monitoring, FIG. 4 to FIG. 5 illustrate schematic diagrams of a process of passive monitoring, and FIG. 6 to FIG. 7 illustrate schematic diagrams of a process of active monitoring. Specific data mentioned in the following description are all examples and are not intended to limit the scope of protection of the present disclosure. It should be understood that embodiments described below may also include additional actions not shown and/or may omit actions shown, and the scope of the present disclosure is not limited in this regard.

Figure 3:
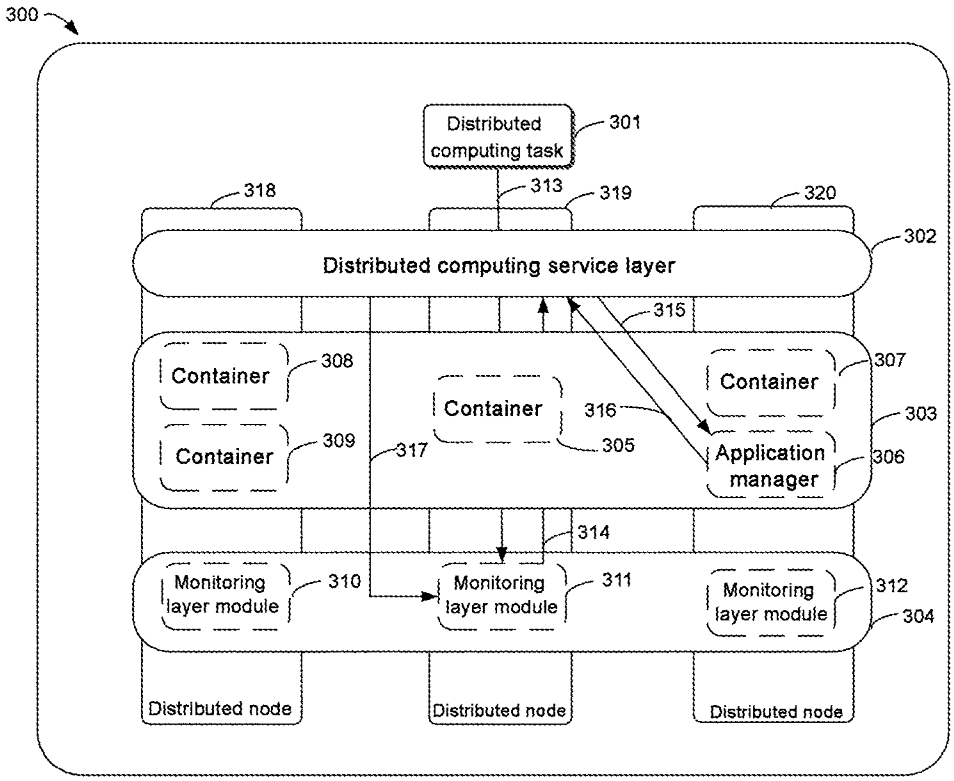
FIG. 3 illustrates a schematic diagram of a process of obtaining an application identification by a first node according to some embodiments of the present disclosure.

FIG. 3 illustrates a schematic diagram of a process 300 of obtaining an application identification by a node according to some embodiments of the present disclosure. In some embodiments, the distributed computing performance monitoring layer 115 may include a monitoring layer module 311 located on a node 319, a monitoring layer module 312 located on a node 320, and a monitoring layer module 310 located on a node 318, with the monitoring layer modules collectively part of a distributed computing performance monitoring layer 304. In one example implementation, each node in the distributed system may be configured with a monitoring layer module.

In some embodiments, the monitoring layer module 311 on the node 319 receiving a distributed computing task 301 is taken as an example for explanation and illustration. At 313, the monitoring layer module 311 receives the distributed computing task 301. At 314, the monitoring layer module 311 starts a distributed computing service layer 302 on the node 319. At 315, the distributed computing service layer 302 sends a request for registering an application manager 306 to a cluster resource management layer 303. After being registered, the application manager 306 will manage and schedule computing resources for current distributed work, for example, the application manager deploys a container 305 on the node 319, deploys a container 307 on the node 320, and deploys a container 308 and a container 309 on the node 318. It should be understood that for a new distributed task, the application manager 306 needs to allocate a new container to provide resource support, and thus containers located on different nodes are not generated at one time, but updated continuously.

After the application manager 306 is registered successfully, an application identification is generated with it. At 316, the node 319 receives the application identification from the application manager 306, and in other words, a starter in the distributed computing service layer 302 receives the application identification from the application manager 306. At 317, the monitoring layer module 311 located on the node 319 receives the application identification of the application manager 306 from the distributed computing service layer 302, that is, the node 319 obtains the application identification.

FIG. 4 illustrates a schematic diagram of a process 400 of determining process identifications of containers by a node according to some embodiments of the present disclosure. FIG. 3 illustrates a process of obtaining the application identification by the node 319, and after the node 319 obtains the application identification, process identifications of containers need to be determined based on the application identification to achieve the purposes of positioning and monitoring the containers. The FIG. 4 embodiment includes distributed computing task 401, distributed computing service layer 402, cluster resource management layer 403 and distributed computing performance monitoring layer 404. As shown in FIG. 4, at 413, a monitoring layer module 411 among additional monitoring layer modules 410 and 412 in the distributed performance monitoring layer 404 has obtained an application identification, so the monitoring layer module 411 may read a log of an application manager 406. Since process identifications of a container 405, a container 407, a container 408, a container 409, and containers which may be updated later are all recorded in a log of the application manager 406, and therefore at 414, the monitoring layer module 411 can determine the process identifications of the containers.

In some embodiments, after a node 417 determines a process identification, a node 418 and a node 416 may monitor the distributed system by passively receiving the process identification determined by the node 417. At 415-1, the node 416 may receive the process identifications of the container 408 and the container 409 from the node 417. At 415-2, the node 418 may receive the process identification of the container 407 from the node 417. The passive monitoring method may reduce the step that the nodes actively read the application identification, thereby reducing communication resources required between the cluster resource management layer 403 and the distributed computing performance monitoring layer 404.

FIG. 5 illustrates a schematic diagram of a process 500 of monitoring containers by respective nodes in a distributed system according to some embodiments of the present disclosure. The FIG. 5 embodiment includes distributed computing task 501, distributed computing service layer 502, cluster resource management layer 503, distributed computing performance monitoring layer 504, and distributed file storage system 513. The cluster resource management layer 503 includes application manager 506. In an embodiment of the present disclosure, in a distributed computing performance monitoring layer 504, each monitoring layer module 510, 511 and 512 is configured with a system performance analyzer to monitor system level performance indexes and micro-architecture level performance indexes of the distributed system, and the system performance analyzers may select analyzing tools with monitoring performance according to actual needs, such as the “perf” tool.

After process identifications are determined, at 515-3, a node 517 may monitor a container 505 according to a process identification of the container 505, and at 514-2, the node 517 may upload performance indexes obtained by monitoring to the distributed file storage system 513; at 515-4, a node 518 may monitor a container 507 according to a process identification of the container 507, and at 514-3, the node 518 may upload performance indexes obtained by monitoring to the distributed file storage system 513; and at 515-1 and 515-2, a node 516 may monitor a container 508 and a container 509 respectively according to process identifications of the container 508 and the container 509, and at 514-1, the node 516 may upload performance indexes obtained by monitoring to the distributed file storage system 513. The distributed file storage system 513 stores the received system performance indexes by categories according to categories for retrieval by users.

FIG. 6 illustrates a schematic diagram of a process 600 of obtaining an application identification by respective nodes in a distributed system according to some embodiments of the present disclosure. The FIG. 6 embodiment includes distributed computing task 601, distributed computing service layer 602, cluster resource management layer 603 and distributed computing performance monitoring layer 604. The cluster resource management layer 603 includes containers 605, 607, 608 and 609, and application manager 606. In some embodiments, not only does a node 616 actively read a log of application manager 606, but respective nodes in the distributed system may monitor the application manager 606 to determine process identifications of containers. More specifically, after the node 616 obtains an application identification, at 614-1, the node 616 sends the obtained application identification to a node 615, and at 614-2, the node 616 sends the obtained application identification to a node 617.

After obtaining the application identification, respective nodes in the distributed system may monitor an application manager 606 according to the application identification to read a log. At 613-1, a monitoring layer module 611 located at the node 616 monitors the application manager 606 through the application identification; at 613-3, a monitoring layer module 612 located at a node 617 monitors the application manager 606 through the application identification; and at 613-2, a monitoring layer module 610 located at a node 615 monitors the application manager 606 through the application identification.

FIG. 7 illustrates a schematic diagram of a process 700 of determining process identifications of containers and monitoring the containers by respective nodes in a distributed system according to some embodiments of the present disclosure. Respective nodes in the distributed system of the present disclosure monitor the application manager 606 in FIG. 6, and the process identifications of the containers may be determined by reading the log of the application manager 606. The FIG. 7 embodiment includes distributed computing task 701, distributed computing service layer 702, cluster resource management layer 703, distributed computing performance monitoring layer 704, and distributed file storage system 713. The cluster resource management layer 703 includes an application manager 706. At 716-2, a monitoring layer module 711 located at a node 717 determines a process identification of a container 705. At 716-3, a monitoring layer module 712 located at a node 718 determines a process identification of a container 707. At 716-1, a monitoring layer module 710 located at a node 716 determines process identifications of a container 708 and a container 709. After the process identifications are determined, the nodes may monitor the containers by using a system performance analyzer to generate performance indexes of the distributed system, for example, at 715-1, the monitoring layer module 710 monitors the container 709, and at 715-2, the monitoring layer module 710 monitors the container 708.

After the nodes obtain the performance indexes, at 714-2, the node 717 may upload the performance indexes obtained by monitoring to a distributed file storage system 713; at 714-3, the node 718 may upload the performance indexes obtained by monitoring to the distributed file storage system 713; and at 714-1, the node 716 may upload the performance indexes obtained by monitoring to the distributed file storage system 713. The distributed file storage system 713 stores the received system performance indexes by categories according to categories for retrieval by users.

Figure 8:
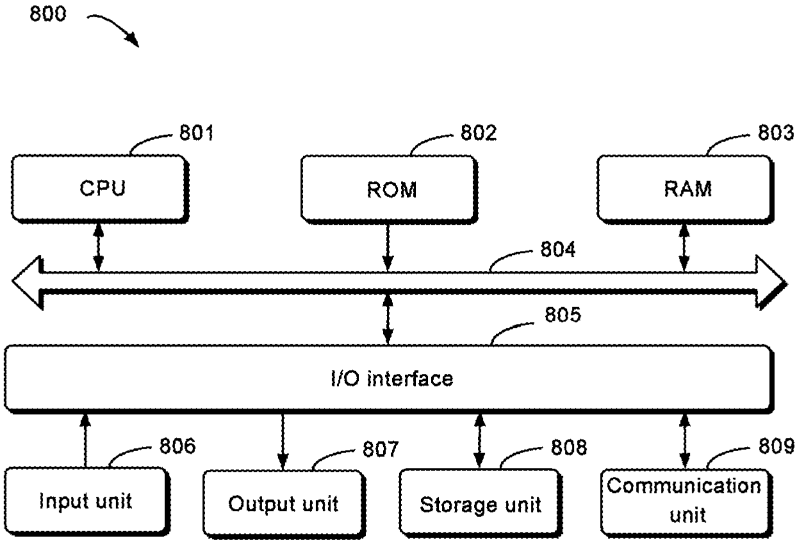
FIG. 8 illustrates a block diagram of a device that can implement a plurality of embodiments of the present disclosure.

FIG. 8 illustrates a schematic block diagram of an example device 800 that can be used to implement an embodiment of the present disclosure. As shown in the figure, the device 800 includes a computing unit 801, which may execute various appropriate actions and processing according to computer program instructions stored in a read-only memory (ROM) 802 or computer program instructions loaded from a storage unit 808 into a random access memory (RAM) 803. Various programs and data required for the operation of the device 800 may also be stored in the RAM 803. The computing unit 801, the ROM 802, and the RAM 803 are connected to each other through a bus 804. An input/output (I/O) interface 805 is also connected to the bus 804.

A plurality of parts in the device 800 are connected to the I/O interface 805, including: an input unit 806, such as a keyboard and a mouse; an output unit 807, such as various types of displays and speakers; a storage unit 808, such as a magnetic disk and an optical disc; and a communication unit 809, such as a network card, a modem, and a wireless communication transceiver. The communication unit 809 allows the device 800 to exchange information/data with other devices via a computer network, such as the Internet, and/or various telecommunication networks.

The computing unit 801 may be various general-purpose and/or special-purpose processing components with processing and computing capabilities. Some examples of the computing unit 801 include, but are not limited to, central processing units (CPUs), graphics processing units (GPUs), various specialized artificial intelligence (AI) computing chips, various computing units for running machine learning model algorithms, digital signal processors (DSPs), and any appropriate processors, controllers, microcontrollers, etc. The computing unit 801 performs various methods and processes described above, such as the method 200. For example, in some embodiments, the method 200 may be implemented as a computer software program that is tangibly included in a machine-readable medium such as the storage unit 808. In some embodiments, some or all of the computer program may be loaded and/or installed onto the device 800 via the ROM 802 and/or the communication unit 809. When the computer program is loaded to the RAM 803 and executed by the computing unit 801, one or more steps of the method 200 described above may be performed. Alternatively, in other embodiments, the computing unit 801 may be configured to implement the method 200 in any other suitable manners (such as by means of firmware).

The functions described hereinabove may be performed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, RAM, ROM, an erasable programmable read-only memory (EPROM or flash memory), an optical fiber, a portable compact disc read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method for monitoring a distributed system, comprising:

starting a distributed computing service on a first node in response to receiving a distributed task;

sending, from the first node to a second node, a request for registering an application manager;

receiving, from the second node by the first node, an application identification of the application manager;

determining, by the first node, process identifications of containers in a cluster resource management layer based on the received application identification; and monitoring performance indexes of the distributed system based on the process identifications.

2. The method according to claim 1, wherein starting the distributed computing service on the first node comprises:

starting the distributed computing service by a starter in the first node in response to receiving the distributed task; and monitoring the distributed computing service by monitoring the starter.

3. The method according to claim 2, wherein receiving the application identification of the application manager from the second node by the first node comprises:

receiving, from the second node by the first node, the application identification of the application manager based on monitoring of the first node for the distributed computing service.

4. The method according to claim 1, wherein determining the process identifications of the containers in the cluster resource management layer by the first node comprises:

receiving, from the second node by the first node, a log updated by the application manager based on the received application identification of the application manager; and determining, by the first node, the process identifications of the containers in the cluster resource management layer based on the received log updated by the application manager.

5. The method according to claim 4, wherein monitoring the performance indexes of the distributed system comprises:

sending the process identifications of the containers from the first node to the second node;

monitoring, by the first node, a container located on the first node based on the process identifications; and monitoring, by the second node, a container located on the second node based on the process identifications.

6. The method according to claim 1, further comprising:

receiving, from the second node by a third node, an application identification of the application manager;

determining, by the third node, a process identification of a container in the cluster resource management layer based on the received application identification of the application manager; and monitoring, by the third node, the performance indexes of the distributed system based on the process identifications.

7. The method according to claim 6, wherein monitoring the performance indexes of the distributed system by the third node comprises:

monitoring, by the third node, a container located on the third node based on the process identifications.

8. The method according to claim 1, further comprising: storing, by the first node, the monitored performance indexes of the distributed system by categories based on the application identification and the process identifications.

9. An electronic device, comprising:

at least one processor; and a memory coupled to the at least one processor and having instructions stored thereon, wherein the instructions, when executed by the at least one processor, cause the electronic device to perform actions for monitoring a distributed system, the actions comprising:

starting a distributed computing service on a first node in response to receiving a distributed task;

sending, from the first node to a second node, a request for registering an application manager;

receiving, from the second node by the first node, an application identification of the application manager;

determining, by the first node, process identifications of containers in a cluster resource management layer based on the received application identification; and monitoring performance indexes of the distributed system based on the process identifications.

10. The electronic device according to claim 9, wherein starting the distributed computing service on the first node comprises:

starting the distributed computing service by a starter in the first node in response to receiving the distributed task; and monitoring the distributed computing service by monitoring the starter.

11. The electronic device according to claim 10, wherein receiving the application identification of the application manager from the second node by the first node comprises:

receiving, from the second node by the first node, the application identification of the application manager based on monitoring of the first node for the distributed computing service.

12. The electronic device according to claim 9, wherein determining the process identifications of the containers in the cluster resource management layer by the first node comprises:

receiving, from the second node by the first node, a log updated by the application manager based on the received application identification of the application manager; and determining, by the first node, the process identifications of the containers in the cluster resource management layer based on the received log updated by the application manager.

13. The electronic device according to claim 12, wherein monitoring the performance indexes of the distributed system comprises:

sending, from the first node to the second node, the process identifications of the containers;

monitoring, by the first node, a container located on the first node based on the process identifications; and monitoring, by the second node, a container located on the second node based on the process identifications.

14. The electronic device according to claim 9, wherein the actions further comprise:

receiving, from the second node by a third node, an application identification of the application manager;

determining, by the third node, a process identification of a container in the cluster resource management layer based on the received application identification of the application manager; and monitoring, by the third node, the performance indexes of the distributed system based on the process identifications.

15. The electronic device according to claim 14, wherein monitoring the performance indexes of the distributed system by the third node comprises:

monitoring, by the third node, a container located on the third node based on the process identifications.

16. The electronic device according to claim 9, wherein the actions further comprise:

storing, by the first node, the monitored performance indexes of the distributed system by categories based on the application identification and the process identifications.

17. A computer program product, wherein the computer program product is tangibly stored on a non-transitory computer-readable medium and comprises machine-executable instructions that, when executed by a machine, cause the machine to perform actions for monitoring a distributed system, the actions comprising:

starting a distributed computing service on a first node in response to receiving a distributed task;

sending, from the first node to a second node, a request for registering an application manager;

receiving, from the second node by the first node, an application identification of the application manager;

determining, by the first node, process identifications of containers in a cluster resource management layer based on the received application identification; and monitoring performance indexes of the distributed system based on the process identifications.

18. The computer program product according to claim 17, wherein starting the distributed computing service on the first node comprises:

starting the distributed computing service by a starter in the first node in response to receiving the distributed task; and monitoring the distributed computing service by monitoring the starter.

19. The computer program product according to claim 18, wherein receiving the application identification of the application manager from the second node by the first node comprises:

receiving, from the second node by the first node, the application identification of the application manager based on monitoring of the first node for the distributed computing service.

20. The computer program product according to claim 17, wherein determining the process identifications of the containers in the cluster resource management layer by the first node comprises:

receiving, from the second node by the first node, a log updated by the application manager based on the received application identification of the application manager; and determining, by the first node, the process identifications of the containers in the cluster resource management layer based on the received log updated by the application manager.

* * * * *